United States Patent [19]

Bailey et al.

[11] Patent Number: 5,082,020

[45] Date of Patent: Jan. 21, 1992

[54] VALVE BODY FOR OILFIELD APPLICATIONS

[75] Inventors: Thomas F. Bailey; John E. Campbell, both of Houston, Tex.

[73] Assignee: MASX Energy Services Group, Inc., Houston, Tex.

[21] Appl. No.: 622,302

[22] Filed: Dec. 5, 1990

Related U.S. Application Data

[63] Continuation of Ser. No. 312,855, Feb. 21, 1989, abandoned.

[51] Int. Cl.⁵ ............................................... F16K 15/06
[52] U.S. Cl. ........................ 137/533.21; 137/516.29; 137/902
[58] Field of Search .................. 137/516.29, 533.17, 137/533.21, 533.31, 902

[56] References Cited

U.S. PATENT DOCUMENTS

| | | |
|---|---|---|
| 141,309 | 7/1873 | Barnes . |
| 592,235 | 10/1897 | Campbell . |
| 792,353 | 6/1905 | Schreidt . |
| 2,564,023 | 8/1951 | Miller . |
| 2,792,016 | 5/1957 | Shellman ................. 137/516.29 |
| 3,262,701 | 8/1966 | Johnson . |
| 3,323,468 | 6/1967 | Thompson . |
| 3,483,885 | 12/1969 | Leathers ................. 137/516.29 X |
| 4,129,144 | 12/1978 | Andersson et al. . |
| 4,275,756 | 6/1981 | Cairns et al. . |
| 4,422,469 | 12/1983 | LaGrange et al. . |
| 4,535,807 | 8/1985 | Ericson . |
| 4,625,755 | 12/1986 | Reddoch . |
| 4,657,040 | 4/1987 | Torres . |
| 4,660,803 | 4/1987 | Johnston et al. . |
| 4,860,995 | 8/1989 | Rogers ................. 137/902 X |

OTHER PUBLICATIONS

MacClatchie Mfg. Co., "Dowell Valve Body" Drawing Dec. 5, 1966.
MacClatchie Division of Grant Oil Tool Company, Composite Catalog, "Quality Pump Parts", 1985.

Primary Examiner—Robert G. Nilson
Attorney, Agent, or Firm—Edgar A. Zarins; Malcolm L. Sutherland

[57] ABSTRACT

A valve body for use in cementing, fracturing or acidizing operations in well drilling with improved wear resistance to extend the operating life of the valve. The valve includes a hardened metal valve head having urethane legs replaceably attached to the valve head. A urethane valve insert may also be provided to facilitate sealing engagement with the valve seat. The urethane legs reduce the overall weight of the valve to reduce the mass of the pumping valve against the valve seat thereby extending the life of the valve. The valve legs are attached to the valve head through fitting engagement and can be replaced and/or repaired.

8 Claims, 3 Drawing Sheets

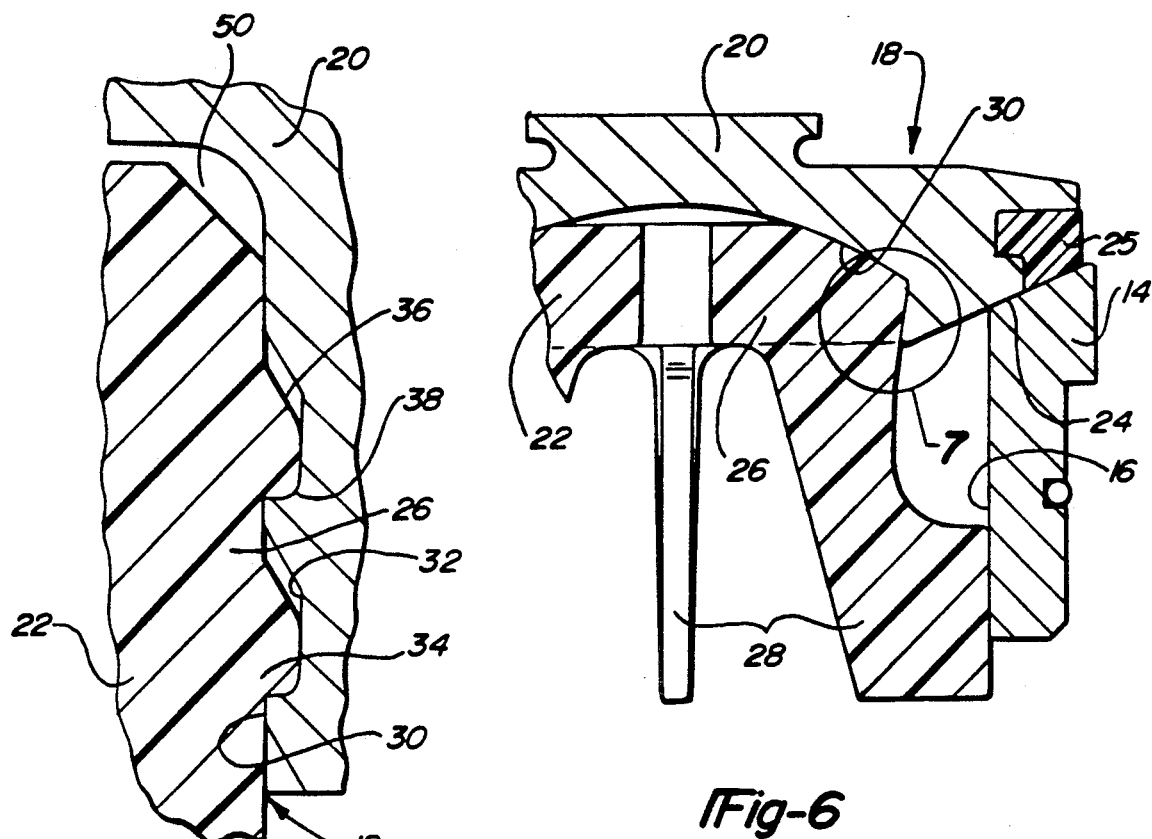
*Fig-5*
*Fig-6*
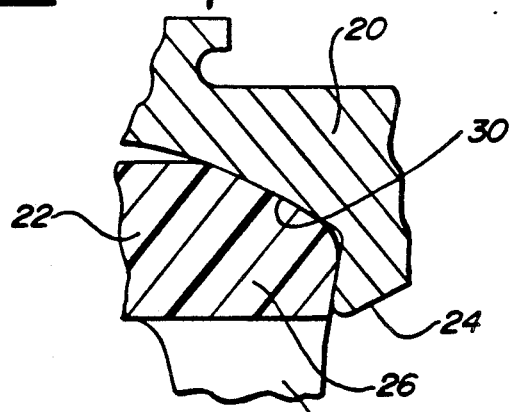
*Fig-7*

VALVE BODY FOR OILFIELD APPLICATIONS

This is a continuation of copending application Ser. No. 07/312,855 filed on Feb. 21, 1989, now abandoned.

BACKGROUND OF THE INVENTION

I. Field of the Invention

This invention relates to a valve used in oilfield pumps for cementing, fracturizing and acidizing operations and, in particular, to a valve adapted to sealing cooperate with a valve seat having a hardened alloy valve head with urethane legs replaceably connected to the valve head in order to reduce the operating mass of the valve thereby increasing productive life.

II. Description of the Prior Art

Pumps and other valving mechanisms are widely used in deep well drilling and production operations. The valve assemblies associated with such devices can be subjected to extreme stresses as the valve pumps several hundred strokes per minute. In addition, the pump may be used in cementing, fracturing or acidizing operations subjecting the valve to an errosive environment. To prevent frequent downtime in the production well, the pump, particularly the valves, must be rugged enough to withstand such an environment yet capable of extreme stroke rates.

Past known valve assemblies used in oilfield application employed one or two piece hardened metal alloy valves which cooperated with a valve seat. The two-piece valve included a valve cap threadably mounted to a valve body having guide legs. A rubber or polyurethane insert ring is mounted between the cap and body to provide sealing engagement between the valve and the valve seat. The one-piece valve includes an integral valve cap and body to which the valve insert is mounted. Although these valves can be removed to replace the sealing insert or the entire valve, such; downtime can be costly and is therefore preferably minimized.

The striking shock of the past known valves results in failure of the valve. The high stroke rate in conjunction with the mass of the valve results in errosion and failure of the valve, the sealing valve insert and also the operating mechanisms associated with the valve. The weight of the metal valve limits the stroke rate yet the valve must be resistant to the wear caused by the pumping fluids and the high shock loads associated with the pumping. Moreover, in the event of damage to the guide legs the entire valve must be replaced. Accordingly, the guide legs are made thicker to reduce breakage thereby further increasing the weight of the valve. All of these factors limit the effectiveness and operating life of the past known valve assemblies.

SUMMARY OF THE PRESENT INVENTION

The present invention overcomes the disadvantages of the past known valve assemblies utilized in oilfield applications by providing a reduced weight valve which increases the operating life of the valve and facilitates repair and replacement.

The valve of the present invention is adapted to cooperate with a valve seat having a full open bore through which the pumping material passes. In a preferred embodiment of the present invention, the valve comprises a valve head and valve body detachably secured to the valve head. The valve head is made of a hardened forged alloy, heat-treated to produce a hard case over a ductile steel core in order to provide wear resistance and the ability to take high shock loads. In order to reduce the weight of the valve, the valve body is preferably made of a urethane material. The valve body includes a plurality of guide legs to facilitate proper stroke travel. As a result, the weight of the valve is reduced by approximately 65% while the urethane legs are less likely to shear than the metal guide legs of the past known valves.

The present invention contemplates several alternative means for securely attaching the valve body to the valve head. The first alternative employs a valve body which snaps together with the valve head. The valve head includes an annular cavity formed in its underside which has one or more annular grooves formed in the side wall thereof. The valve body includes at least one annular flange adapted to be matingly received in a corresponding groove. The flange and groove are configured to facilitate snap together assembly yet resist separation under the operating stresses. A second alternative utilizes a threaded engagement between the head and valve body whereby the valve body screws into the valve head. The threads are specially configured to facilitate assembly yet resist disconnection. A third alternative provides the valve body with a mushroom-shaped upper end which cooperates with a similarly configured annular cavity in the valve head. All of these configurations facilitate assembly of the valve, reduce the weight and therefore the operating mass of the valve, and simplify repair and/or replacement.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 5 is an enlarged cross-sectional perspective of a second embodiment of the valve;

FIG. 6 is a partial cross-sectional perspective of a third embodiment of the valve;

FIG. 7 is an enlarged cross-sectional perspective of Section 7 in FIG. 6;

DETAILED DESCRIPTION OF A PREFERRED EMBODIMENT OF THE PRESENT INVENTION

Figure 1:
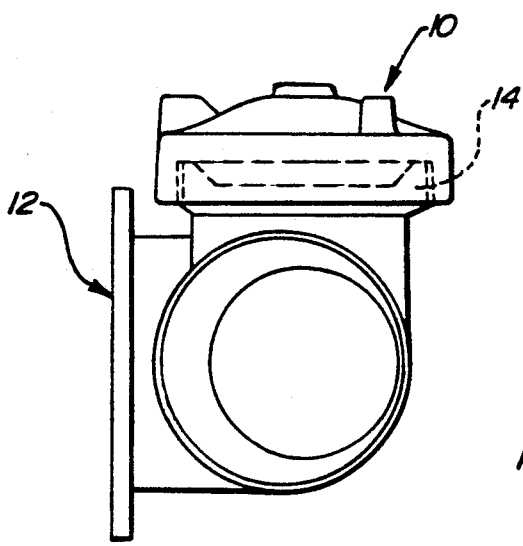
FIG. 1 is a side elevational perspective of a pump assembly embodying the improved valve of the present invention.

Referring to the drawing, there is shown several embodiments of an improved valve construction for use in oilfield applications such as for cementing, fracturing or acidizing operations. Referring first to FIG. 1, the valve assembly 10 embodying the present invention is utilized in a pump housing 12 adapted to pump the appropriate fluid either from the surface into the borehole or from the borehole to the surface. Typical pumps 12 may include several valve assemblies 10 linearly aligned to increase pump volume. Because of the demands of deep well drilling, such valve assemblies 10 can be subjected to extreme pressures and temperatures. In addition, since some modern pumps 12 are capable of hundreds of strokes per minute, the valve assemblies 10 are subject to high shock loads as well as errosive wear from the material being pumped. The valve assembly 10 embodying the present invention combines the ability to withstand such pressures and wear while reducing the shock loads associated with the reciprocating pumping action of the valve assembly 10.

Figure 2:
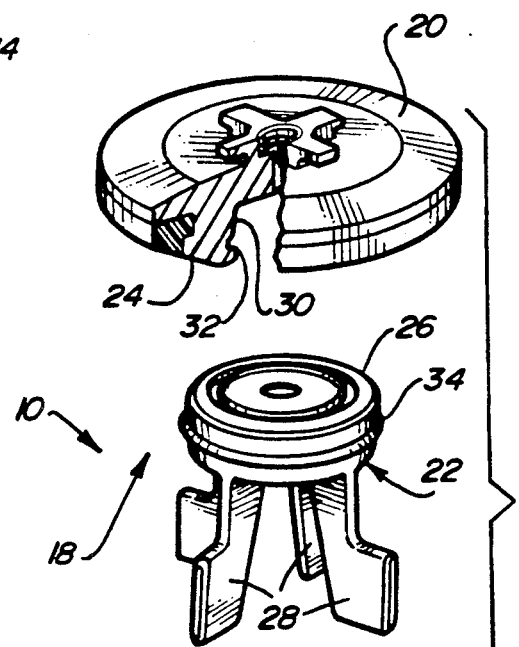
FIG. 2 is an exploded view shown in partial cross-section of a first embodiment of a valve assembly embodying the present invention.

Referring now to FIG. 2, the valve assembly 10 generally comprises a valve seat 14 having a fluid flow through bore 16 and a valve 18 reciprocatingly received by the valve seat 14. The valve 18 includes a combined valve head 20 and valve body 22. The valve head 20 includes an underside surface 24 adapted to cooperate with the valve seat 14. A sealing ring 25 may be provided on this underside surface 24 to enhance the sealing cooperation of the valve 18 with the valve seat 14 when the valve assembly 10 is closed. In a preferred embodiment of the present invention, the valve head 20 is made of a hardened forged metal alloy which is resistant to wear while the valve body 22 is made of an elastomer or urethane material designed to reduce the weight and therefore the stroke load of the valve 18. It is contemplated that elastomer materials would be used in fluid environments which would not be conducive to urethane materials. The integrally molded valve body 22 includes a neck portion 26 and a plurality of guide legs 28 extending downwardly from the neck 26. In addition to reducing the weight of the valve 22 and therefore increasing its operating life, the elastomer-/urethane legs 28 are less likely to shear under operating stresses than the conventional metal guide legs. Nevertheless, if the guide legs 28 do fail, repair/replacement of the valve body 22 is easily accomplished as will be subsequently described.

In a preferred embodiment of the valve 18, the valve head 20 includes an annular cavity 30 formed in the underside thereof and configured to matingly receive the annular neck portion 26 of the valve body 22. The annular neck 26 and cavity 30 include means for lockingly attaching the valve head 20 to the valve body 22 such that the valve 18 can reciprocate within the valve seat 14 without separation of the valve head 20 and valve body 22 yet, if necessary, the valve body 22 can be separated from the valve head 20 for repair or replacement. The two-piece construction also reduces manufacturing costs since the valve head 20 and valve body 22 are more economically manufactured separately and later assembled.

Figure 4:
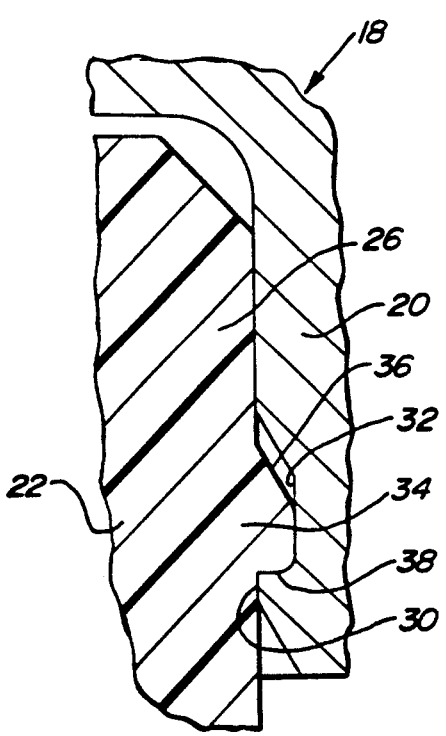
FIG. 4 is an enlarged cross-sectional perspective of Section 4 in FIG. 3.
Figure 3:
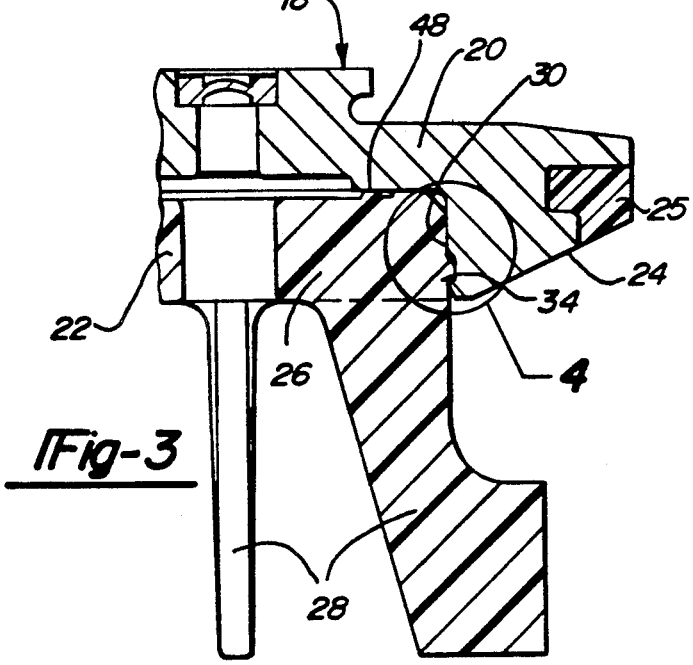
FIG. 3 is a partial cross-sectional perspective of the first embodiment of the valve.

FIGS. 2 through 4 show a first embodiment of the means for lockingly attaching the valve head 20 to the valve body 22. The cavity 30 of the valve head 20 is provided with an annular groove 32 and the neck portion 26 of the valve body 22 is provided a corresponding annular tongue 34 which is lockingly received within the groove 32 upon assembly of the valve 18. Preferably the tongue 34 has a configuration which provides a sloped but substantially planar upper surface 36 and a semi-cylindrical lower surface 38 giving the tongue 34 a partial tear-drop shape. The sloped upper surface 36 facilitates insertion of the neck 26 into the cavity 30 by allowing the inner annular surface of the cavity to pass over the tongue 34. Conversely, the semi-cylindrical lower surface 38 resists removal of the valve body 22 from the valve head 20 by lockingly cooperating with the groove 32 which has a corresponding configuration. However, the semi-cylindrical configuration does not prevent separation of the valve body 22 and valve head 20 if necessary. Although the invention is described and shown with the valve head 20 having a neck 26, it is to be understood that the valve body 22 may be provided with a cavity which receives a neck or post extending from the underside of the valve head. Furthermore, the tongue and groove may be reversed such that the cavity includes an annular tongue while the neck includes a mating groove.

In a second embodiment of the present invention shown in FIG. 5, two or more tongue 34 and groove 32 combinations may be provided to increase the locking engagement between the valve body 22 and the valve head 20. In this embodiment, the sloped upper surface 36 allows the uppermost tongue to move past the first groove 32. The more tongue 34 and groove 32 combinations which are provided the more difficult it will be to separate the valve body 22 from the valve head 20. Nevertheless, the elastic properties of the elastomer valve body 22 will facilitate assembly while also permitting disassembly of the valve 18.

FIGS. 6 and 7 show another snap-fit assembly of the valve head 20 and valve body 22. This third embodiment of the invention employs a mushroom-shaped neck portion 26 which mates with a similarly configured cavity 30. The neck 26 has a larger diameter at its upper end than at its lower end. Similarly, the upper end of the annular inner surface of the cavity 30 has a greater diameter than the lower end. As a result, the reduced diameter portion of the cavity 30 retards withdrawal of the larger diameter portion of the neck 26. However, the resilient properties of the urethane neck portion 26, and to some extent the cavity walls, allow assembly of the valve head and body under sufficient pressure.

Figure 8:
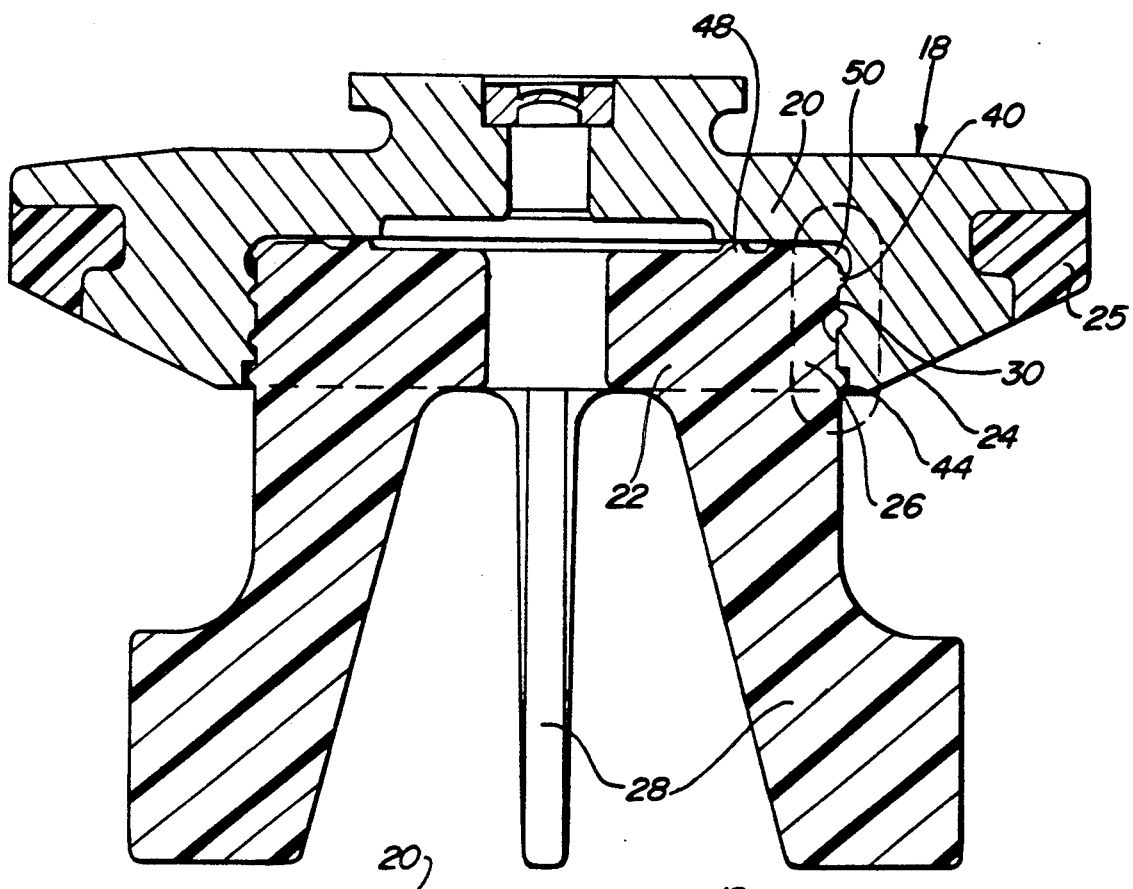
FIG. 8 is a partial cross-sectional perspective of a fourth embodiment of the valve.
Figure 9:
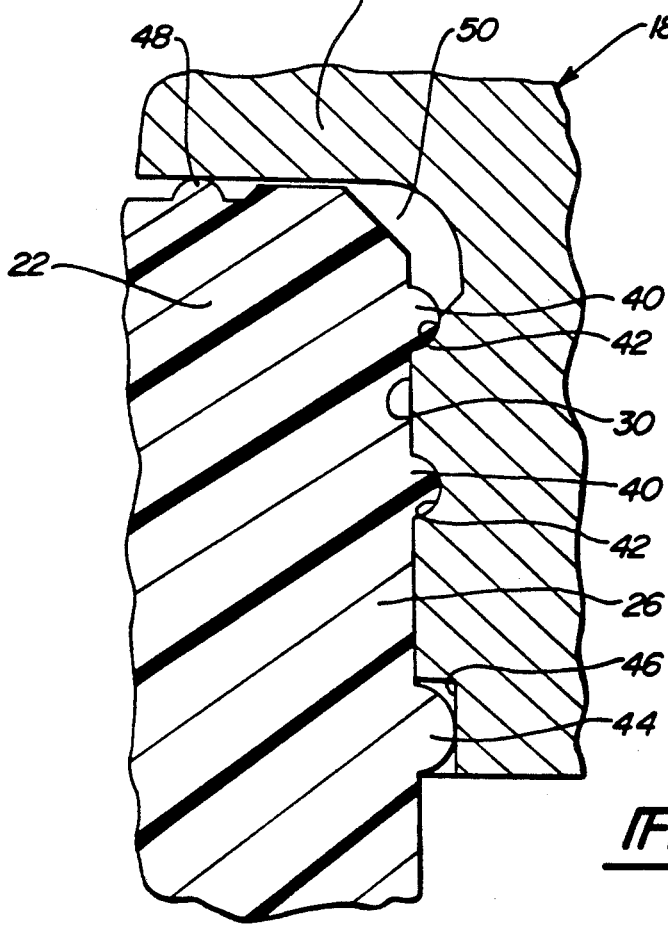
FIG. 9 is an enlarged cross-sectional perspective of Section 9 in FIG. 8.

A fourth embodiment shown in FIGS. 8 and 9 utilizes a threaded engagement to connect the valve head 20 to the valve body 22. Preferably, the neck portion 26 is provided with a single continuous thread form 40 around its outer periphery and the inner annular surface of the cavity 30 is provided with a corresponding thread groove 42. Although more than one thread may be provided, manufacturing costs will increase as a result and one continuous thread is sufficient to provide the necessary locking engagement. As is best shown in FIG. 9, the thread form preferably has a semi-circular cross-sectional configuration. Such a configuration can be molded into the elastomer valve body 22 and increases the reliability of the assembly by reducing the likelihood of stripping the threads. To prevent the valve body 22 from being threaded too far into the valve head 20, the neck portion 26 includes a terminal annular flange 44 formed longitudinally below the thread form 40. The terminal flange 44 will engage the head 20 to prevent further rotation and longitudinal movement of the valve body 22 with respect to the valve head 20. An annular groove 46 may be provided to receive the terminal flange 44. In this manner, proper orientation of the valve body 22 with respect to the valve head 20 is assured. Furthermore, the flange 44 cooperates with annular flange 48 formed on the upper surface of the valve body 22 to form a sealed chamber 50. The pressure differential between the chamber 50 and the environment surrounding the valve 10 acts to further prevent the valve body 22 from detaching from the valve head 20. The environment surrounding the valve 10 is at a higher pressure than the pressure within the chamber 50 thereby creating an attraction between the two components.

Thus, the present invention provides a valve assembly with sufficient strength and integrity to be utilized in oilfield applications yet can be manufactured, assembled and repaired, if necessary at reduced costs. Furthermore, by reducing the overall weight of the reciprocating valve the shock loads associated with operation are reduced thereby increasing the operating life of the valve assembly. Nevertheless, the means for lockingly assembling the valve allow for the use of weight reducing materials while assuring integrity.

The foregoing detailed description has been given for clearness of understanding only and no unnecessary limitations should be understood therefrom as some modifications will be obvious to those skilled in the art without departing from the scope and spirit of the appended claims.

I claim:

1. A valve to pump fluids, said valve sealingly cooperating with a valve seat having a throughbore, said valve comprising:
   a valve head having an axial cavity with an interior annular side wall;
   a valve body attached to said valve head, said valve body including an axial neck portion received within said cavity of said valve head and having an outer annular surface corresponding to said interior annular side wall of said cavity; and
   means to lockingly attach said valve body to said valve head, said valve head being made of a metal material and said valve body being made of an elastomer material, said locking means including at least one annular tongue formed on said outer annular surface of said neck portion of said valve body, said at least one tongue having a frusto-conical upper surface, a cylindrical intermediate surface and a curved lower surface said at least one annular tongue lockingly engaging at least one corresponding annular groove formed in said interior annular side wall of said internal cavity of said valve head thereby preventing inadvertent withdrawal of said neck portion from said cavity and separation of said valve body from said valve head.

2. The valve as defined in claim 1 and further comprising a sealing ring attached to said valve head and positioned to sealingly cooperate with the valve seat.

3. The valve as defined in claim 1 wherein said valve body includes a plurality of guide legs integrally formed with said neck portion, said guide legs adapted to cooperate with the throughbore of the valve seat to guide the reciprocating movement of said valve.

4. The valve as defined in claim 1 wherein said at least one annular tongue is matingly received within said corresponding at least one annular groove upon insertion of said neck portion into said cavity.

5. In a valve assembly used in downhole applications for the pumping of fluids, the valve assembly including a valve seat having a throughbore and a valve received by the valve seat to selectively close the throughbore, the improved valve comprising:
   a valve head having an annular cavity with an end wall and an inner annular side wall surface;
   a valve body having an annular neck having an outer annular surface lockingly received within said annular cavity to attach said valve body to said valve head; and
   means to lockingly secure said annular neck of said valve body within said annular cavity of said valve head, said means formed in said outer annular surface of said annular neck and said inner annular surface of said valve head and including at least one annular groove formed in the inner annular surface of said cavity and at least one annular tongue formed on the outer annular surface of said neck, said at least one tongue having a frusto-conical upper surface, a cylindrical intermediate surface and a curved lower surface and being cooperatingly received within said at least one groove to lockingly attach said valve body to said valve head.

6. The valve as defined in claim 5 and further comprising a sealing ring attached to said valve head to sealingly cooperate with the valve seat.

7. The valve as defined in claim 5 wherein said valve boy includes a plurality of guide legs integrally formed with said annular neck, said guide legs adapted to cooperate with the throughbore to guide the reciprocating movement of said valve with respect to the valve seat.

8. In a valve assembly used in downhole applications for the pumping of fluids, the valve assembly including a valve seat having a throughbore and a valve received by the valve seat to selectively close the throughbore, the improved valve comprising:
   a valve head made of a metal material, said valve head having an annular cavity;
   a valve body made of an elastomer material, said valve body having an annular neck received within said annular cavity to attach said valve head to said valve body; and
   means to lockingly attach said valve head to said valve body to prevent inadvertent separation of said valve head from said valve body, said means including at least one annular groove formed in said annular cavity of said valve head and at least one cooperating annular tongue formed on said annular neck of said valve body, said at least one annular tongue having a frusto-conical upper surface, a cylindrical intermediate surface and a curved lower surface received within said at least one annular groove to lockingly secure said valve body to said valve head.

* * * * *